(12) United States Patent
Yamaguchi et al.

(10) Patent No.: US 10,739,587 B2
(45) Date of Patent: Aug. 11, 2020

(54) HEAD-UP DISPLAY APPARATUS

(71) Applicant: DENSO CORPORATION, Kariya, Aichi-pref. (JP)

(72) Inventors: Masayuki Yamaguchi, Kariya (JP); Takahiro Nambara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 250 days.

(21) Appl. No.: 15/780,649

(22) PCT Filed: Sep. 26, 2016

(86) PCT No.: PCT/JP2016/078140
§ 371 (c)(1),
(2) Date: Jun. 1, 2018

(87) PCT Pub. No.: WO2017/094333
PCT Pub. Date: Jun. 8, 2017

(65) Prior Publication Data
US 2018/0373028 A1   Dec. 27, 2018

(30) Foreign Application Priority Data

Dec. 3, 2015 (JP) ................................. 2015-236912

(51) Int. Cl.
*G02B 27/01*   (2006.01)
*B60K 35/00*   (2006.01)
(Continued)

(52) U.S. Cl.
CPC .......... *G02B 27/0101* (2013.01); *B60K 35/00* (2013.01); *G02B 5/208* (2013.01);
(Continued)

(58) Field of Classification Search
CPC .. G02B 27/0101; G02B 5/208; G02B 27/288; G02B 2027/0118; B60K 35/00;
(Continued)

(56) References Cited

FOREIGN PATENT DOCUMENTS

JP   2002293162 A   10/2002
JP   2003057587 A    2/2003
(Continued)

*Primary Examiner* — Wen Huang
(74) *Attorney, Agent, or Firm* — Harness, Dickey & Pierce, P.L.C.

(57) ABSTRACT

A projector projects a polarized light of an image. A light guide portion guides the light toward a projection member. A polarizing plate on an optical path has a transmission axis along which transmittance of the polarized light becomes maximum. An image longitudinal direction is along a vertical direction of a vehicle. An image lateral direction is perpendicular to the image longitudinal direction. A projection polarization azimuth angle is an azimuth angle of a polarization direction of the light relative to the image lateral direction. A transmission axis azimuth angle is an azimuth angle of the transmission axis of the polarizing plate relative to the image lateral direction. The polarizing plate makes the projection polarization azimuth angle different from the transmission axis azimuth angle to tilt the polarization direction of the light of the image relative to both of the image longitudinal direction and the image lateral direction.

5 Claims, 5 Drawing Sheets

(51) Int. Cl.
   *G02B 5/20* (2006.01)
   *G02B 27/28* (2006.01)

(52) U.S. Cl.
   CPC .... *G02B 27/288* (2013.01); *B60K 2370/1529* (2019.05); *B60K 2370/18* (2019.05); *B60K 2370/23* (2019.05); *B60K 2370/25* (2019.05); *B60K 2370/27* (2019.05); *B60K 2370/31* (2019.05); *B60K 2370/334* (2019.05); *G02B 2027/0118* (2013.01)

(58) Field of Classification Search
   CPC ........ B60K 2370/1529; B60K 2370/18; B60K 2370/31; B60K 2370/27; B60K 2370/23; B60K 2370/334; B60K 2370/25
   See application file for complete search history.

(56) References Cited

FOREIGN PATENT DOCUMENTS

| | | |
|---|---|---|
| JP | 2008070504 A | 3/2008 |
| JP | 4114194 B2 | 7/2008 |
| JP | 2010152025 A | 7/2010 |
| JP | 2014115408 A | 6/2014 |

HEAD-UP DISPLAY APPARATUS

CROSS REFERENCE TO RELATED APPLICATIONS

This application is a U.S. National Phase Application under 35 U.S.C. 371 of International Application No. PCT/JP2016/078140 filed on Sep. 26, 2016 and published in Japanese as WO 2017/094333 A1 on Jun. 8, 2017. This application is based on and claims the benefit of priority from Japanese Patent Application No. 2015-236912 filed on Dec. 3, 2015. The entire disclosures of all of the above applications are incorporated herein by reference.

TECHNICAL FIELD

The present disclosure relates to a head-up display apparatus (hereinafter abbreviated to HUD apparatus) mounted on a vehicle to display a virtual image which is visually recognizable by an occupant.

BACKGROUND ART

Conventionally, an HUD apparatus that is mounted on a vehicle and displays a virtual image, which can is visually recognizable by an occupant, has been known. An HUD apparatus disclosed in Patent Literature 1 includes a projector that projects a polarized image light, a light guide portion that guides the light of the image from the projector toward a projection member, and a polarizing plate that is located on an optical path between the light guide portion and the projection member.

In this example, the polarizing plate is located so as to shield a stray light from the projector.

PATENT LITERATURE

Patent Literature 1: JP-A-2010-152025

An occupant who views a virtual image may visually recognize the virtual image in a state of naked eyes or may visually recognize the virtual image in a state of wearing polarizing sunglasses. In this example, the polarizing sunglasses are generally set so as to have a maximum transmittance with respect to a light polarized in the vertical direction of the vehicle.

In this regard, when the polarizing plate is located for light shielding of a stray light as in Patent Literature 1, there is a concern that components of the polarized light in the vertical direction of the vehicle in the light of the image transmitted through the polarizing plate and reflected on the projection member cannot be sufficiently obtained. If the components of the polarized light in the vertical direction of the vehicle cannot be obtained sufficiently, the luminance is insufficient in the state where the polarizing sunglasses are worn. Consequently, this situation makes it difficult to virtually recognize the virtual image.

SUMMARY OF INVENTION

It is an object of the present disclosure to provide an HUD apparatus configured to attain both of a visibility in a state of naked eyes and a visibility in a state of wearing polarizing sunglasses.

According to one aspect of the present disclosure, a head-up display apparatus is to be mounted on a vehicle to project an image on a projection member by causing a light of the image to be reflected on the projection member to display a virtual image of the image visible by an occupant. The head-up display apparatus comprises a projector to project a polarized light of the image. The head-up display apparatus further comprises a light guide portion to guide the light of the image from the projector toward the projection member. The head-up display apparatus further comprises a polarizing plate located on an optical path between the light guide portion and the projection member and has a transmission axis along which a transmittance of the polarized light becomes maximum.

An image longitudinal direction is defined as a direction along a vertical direction of the vehicle, and an image lateral direction is defined as a direction perpendicular to the image longitudinal direction in the image, in a condition where the image is displayed as the virtual image. A projection polarization azimuth angle is defined as an azimuth angle of a polarization direction of the light of the image projected from the projector, and a transmission axis azimuth angle is defined as an azimuth angle of the transmission axis of the polarizing plate, the azimuth angles being relative to the image lateral direction as a reference orientation. The polarizing plate makes the projection polarization azimuth angle different from the transmission axis azimuth angle to tilt the polarization direction of the light of the image reflected on the projection member relative to both of the image longitudinal direction and the image lateral direction.

BRIEF DESCRIPTION OF THE DRAWINGS

The above and other objects, features and advantages of the present disclosure will become more apparent from the following detailed description made with reference to the accompanying drawings. In the drawings.

The aforementioned object, other objects, characteristics, and advantages of the present disclosure become more apparent from a description that will be given with reference to the accompanying drawings. In the drawings.

DESCRIPTION OF EMBODIMENTS

Hereinafter, an embodiment of the present disclosure will be described with reference to the drawings.

Figure 1:
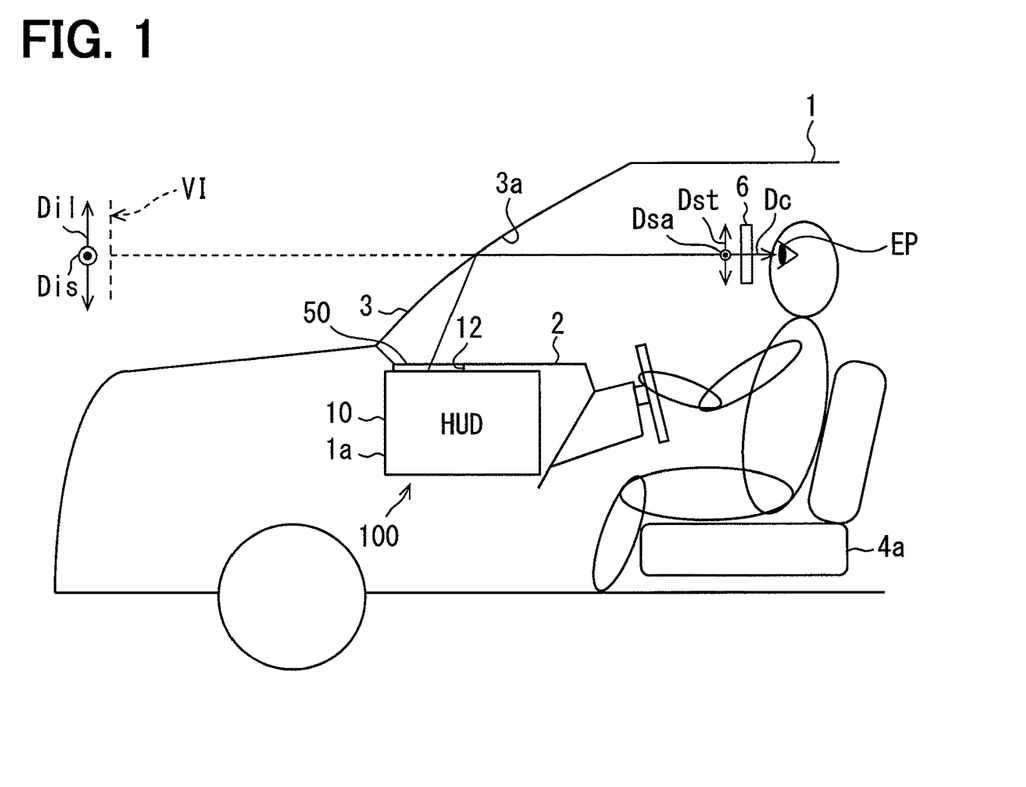
FIG. 1 is a schematic view showing a mounted state of an HUD apparatus on a vehicle according to one embodiment, which is seen from a left side of the vehicle toward a right side of the vehicle.
Figure 2:
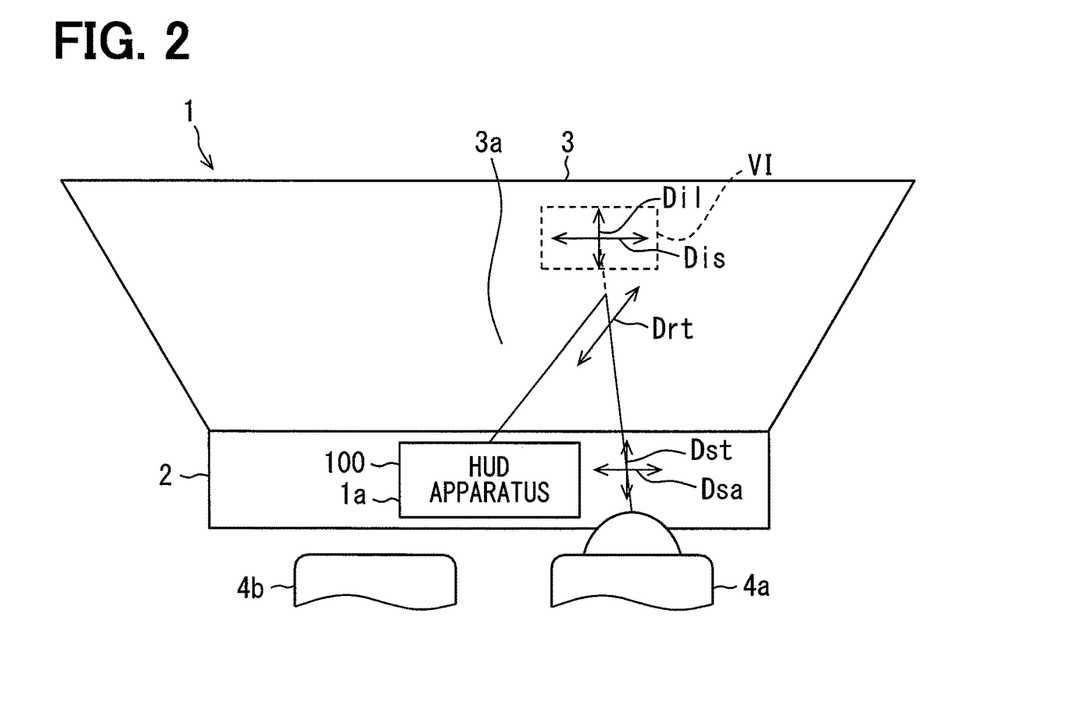
FIG. 2 is a schematic view showing a mounted state of an HUD apparatus on a vehicle according to one embodiment, which is seen from a rear of the vehicle toward a front of the vehicle.

As shown in FIGS. 1 and 2, an HUD apparatus 100 according to an embodiment of the present disclosure is mounted on a vehicle 1 and housed in an accommodation space 1a in an instrument panel. The HUD apparatus 100 projects an image onto a windshield 3 which serves as a projection member of the vehicle 1. A light of the image is reflected on the windshield 3, and the HUD apparatus 100 displays a virtual image of the image that can be viewed by an occupant of the vehicle 1. In other words, the light of the image which is reflected on the windshield 3 reaches an eye point EP of the occupant in a vehicle interior of the vehicle 1, and the occupant senses the light of the image as a virtual image VI. The occupant is capable of recognizing various types of information by the virtual image VI. Examples of various types of information which is displayed as the virtual image of the image include vehicle state values such as a vehicle speed and a remaining fuel level, or navigation information such as road information and visibility auxiliary information.

The windshield 3 of the vehicle 1 is located on an upper side of an instrument panel 2 in the vehicle and is formed in a light transmissive plate shape with glass, synthetic resin or the like. Further, the windshield 3 is located so as to tilt to the rear of the vehicle toward an upper side of the vehicle. On a surface of the windshield 3 on the vehicle interior side, a smooth projection surface 3a onto which an image is projected is formed in a concave surface shape or in a flat planar surface. In this way, an occupant seated on a driver's seat 4a of seats 4a and 4b of the vehicle 1 and facing the front of the vehicle can visually recognize a foreground including a road, road signs, and so on through the windshield 3 and can visually recognize a virtual image display of the image.

Further, in the present embodiment, the accommodation space 1a in the instrument panel 2 is positionally shifted from the seats of the vehicle 1 in a lateral direction of the vehicle. In particular, according to the present embodiment, the accommodation space 1a is provided in the central portion of the instrument panel 2. In this way, a virtual image VI is formed at a position shifted from the accommodation space 1a in the lateral direction of the vehicle.

In the present embodiment, a lower side of the vehicle represents a direction in which a gravity occurs when the vehicle 1 travels on a flat ground or stops on the flat ground. The upper side of the vehicle represents an opposite direction to the lower side of the vehicle. The front of the vehicle represents a direction in which the occupant seated on the seat 4a faces the front. The rear of the vehicle represents a direction opposite to the front of the vehicle. A left side of the vehicle represents a left direction viewed from the occupant facing the front of the vehicle. A right side of the vehicle represents a right direction viewed from the occupant facing the front of the vehicle. Further, the vertical direction of the vehicle represents the upper side of the vehicle and the lower side of the vehicle. The lateral direction of the vehicle represents the left side of the vehicle and the right side of the vehicle.

A direction along the vertical direction of the vehicle when the image is displayed as the virtual image is defined as an image longitudinal direction Dil, and a direction perpendicular to the image longitudinal direction Dil in the image is defined as an image lateral direction Dis. In other words, in the image, the direction recognized by the occupant seated on the seat 4a as the longitudinal direction represents the image longitudinal direction Dil and the direction recognized as the lateral direction is the image lateral direction Dis.

Figure 3:
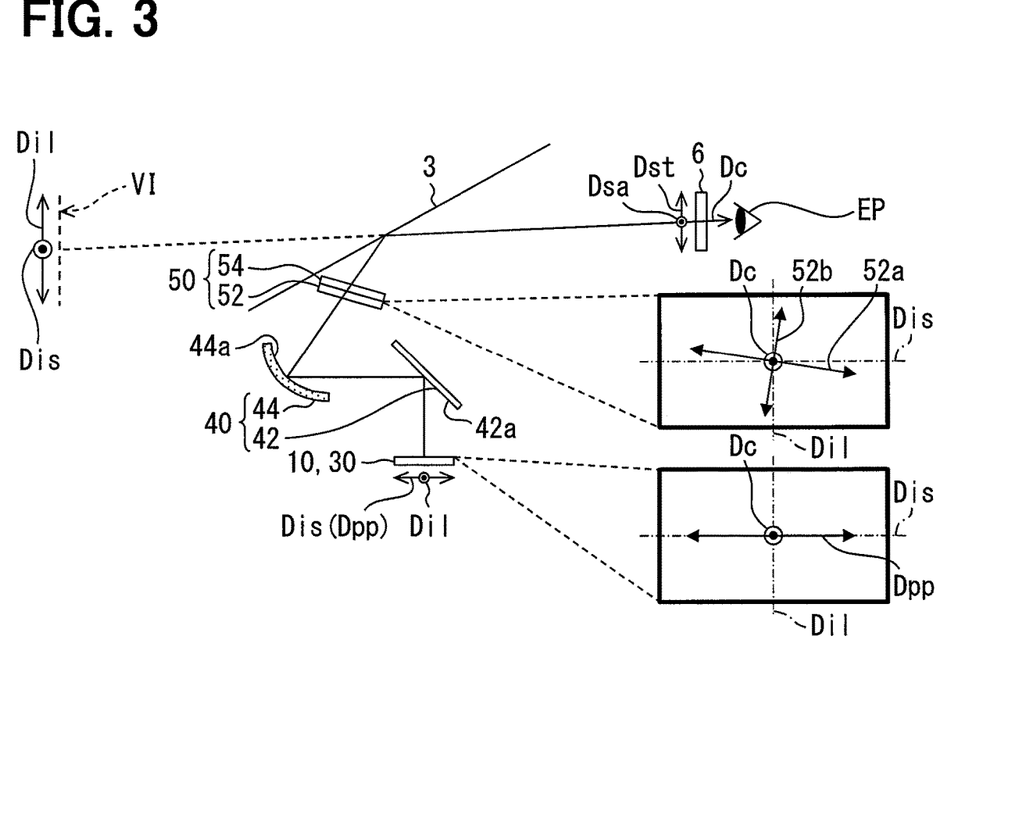
FIG. 3 is a configuration diagram showing a schematic configuration of the HUD apparatus according to the embodiment.

A specific configuration of the HUD apparatus 100 described above will be described below with reference to FIGS. 1 to 5. As shown in FIG. 3, the HUD apparatus 100 includes a housing 10, a projector 20, a light guide portion 40, and a polarizing plate 50.

The housing 10 is formed in a dark hollow shape with, for example, a synthetic resin corresponding to the accommodation space 1a of the vehicle 1. The housing 10 accommodates and fixes the projector 20 and the light guide portion 40. Further, the housing 10 has an opening portion 12. The opening 12 opens at a portion of the housing 10 facing the windshield 3, but as will be described later, the opening portion 12 is eventually closed with the polarizing plate 50.

Figure 4:
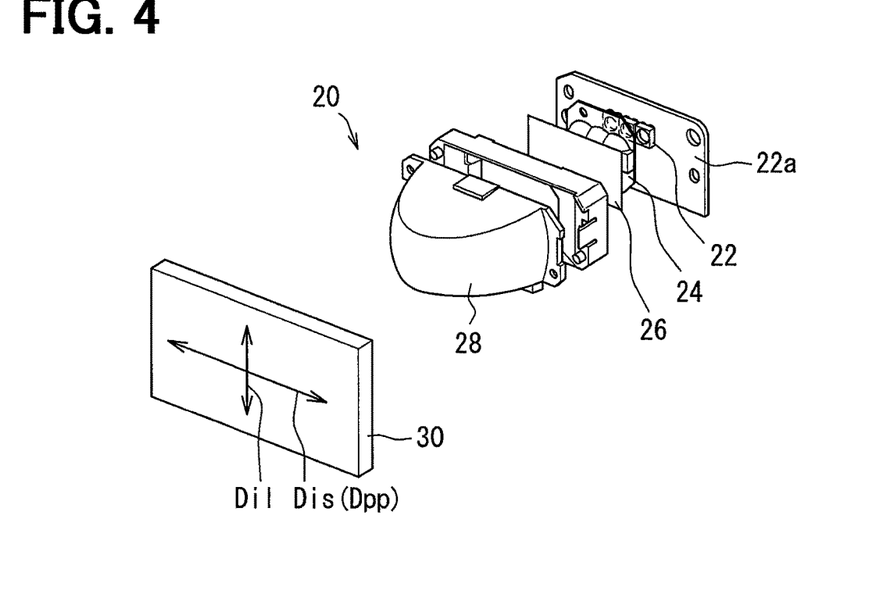
FIG. 4 is a perspective view showing a configuration of a projector according to the embodiment.

As also shown in detail in FIG. 4, the projector 20 includes a light source 22, a condenser lens 24, a diffusion plate 26, a projection lens 28, and a liquid crystal panel 30. For example, the projector 20 is configured to house those components in a projector case formed in, for example, a box type hollow shape.

The light source 22 is formed of multiple light emitting diode devices and is located on a light source circuit board 22a. The light source 22 is electrically connected to a power supply through a wiring pattern on the light source circuit board 22a. The light source 22 emits a light toward the condenser lens 24 with a light emission amount corresponding to the amount of current caused by energization. More specifically, the light source 22 covers, for example, a blue light emitting diode with a phosphor to thereby produce light emission with pseudo white color.

The condenser lens 24 is a light transmissive convex lens made of synthetic resin or glass and is located between the light source 22 and the diffusion plate 26. The condenser lens 24 condenses the light source light from the light source 22 and emits the condensed light toward the diffusion plate 26.

The diffusion plate 26 is a plate made of a synthetic resin or glass and is located between the condenser lens 24 and the projection lens 28. The diffusion plate 26 diffuses the light from the condenser lens 24 toward the projection lens 28 to adjust the uniformity of luminance.

The projection lens 28 is a light transmissive convex lens made of a synthetic resin or glass and is located between the diffusion plate 26 and the liquid crystal panel 30. The projection lens 28 condenses the light from the diffusion plate 26 and projects the condensed light toward the liquid crystal panel 30.

The liquid crystal panel 30 is formed of, for example, a thin film transistor (TFT) and is configured with an active matrix liquid crystal panel that is formed of multiple liquid crystal pixels arrayed in two-dimensional directions of the image longitudinal direction Dil and the image lateral direction Dis. In the liquid crystal panel 30, a pair of liquid crystal polarizing plates and a liquid crystal layer, which is sandwiched between the pair of liquid crystal polarizing plates, are laminated. The liquid crystal polarizing plate has a property to transmit a polarized light whose electric field vector has a predetermined direction and to shield a polarized light whose electric field vector has a direction substantially perpendicular to the predetermined direction. The pair of liquid crystal polarizing plates is arranged substantially orthogonal to each other in the predetermined direction. The liquid crystal layer can rotate the polarization direction of the light incident on the liquid crystal layer according to an applied voltage by applying the voltage for each liquid crystal pixel.

Therefore, the liquid crystal panel 30 controls the transmittance of each liquid crystal pixel so that the projector 20 can project the light of the image. In this example, the light of the image projected from the projector 20 is polarized according to the placement of the liquid crystal polarizing plate on its emission side. Specifically, in the present embodiment, the polarization direction Dpp of the light of the image projected from the projector 20 is along the image lateral direction Dis.

In the present embodiment, in a screen of the liquid crystal panel 30, a dimension in the image lateral direction Dis is longer than a dimension in the image longitudinal direction Dil. Therefore, the image lateral direction Dis corresponds to the longitudinal direction in the image, and the image longitudinal direction Dil corresponds to a transverse direction.

The light guide portion 40 is an optical system that guides the light of the image from the projector 20 toward the windshield 3. The light guide portion 40 has a plane mirror 42 and a concave mirror 44.

The plane mirror 42 is formed by depositing aluminum as a reflecting surface 42a on a surface of a base material made of synthetic resin or glass. The reflecting surface 42a is provided on a side of the projector 20 facing the liquid crystal panel 30 and the concave mirror 44 and is formed in a flat planar shape. The plane mirror 42 reflects the light of the image from the liquid crystal panel 30 toward the concave mirror 44.

The concave mirror 44 is formed by depositing aluminum as a reflecting surface 44a on a surface of a base material made of synthetic resin or glass. The reflecting surface 44a is provided on a side facing the plane mirror 42 and the windshield 3 and is formed into a smoothly curved surface as a concave surface in which the center of the concave mirror 44 is recessed. The concave mirror 44 reflects the light of the image from the plane mirror 42 toward the windshield 3.

In this manner, the light of the image from the projector 20 provides an optical path through the light guide portion 40 and the windshield 3 as shown in FIG. 3.

The polarizing plate 50 is located on the optical path between the light guide portion 40 and the windshield 3. In particular, in the present embodiment, the polarizing plate 50 is provided so as to cover the entire surface of the opening portion 12 of the housing 10. The polarizing plate 50 has a polarizing element layer 52 and an infrared light restriction layer 54, which are laminated on each other.

The polarizing element layer 52 is formed by adding, for example, iodine to polyvinyl alcohol, and has a transmission axis 52a and a light shielding axis 52b substantially orthogonal to each other according to an orientation direction of the iodine molecule. The transmission axis 52a is the axis where the transmittance of the corresponding polarized light becomes maximum. In this example, in the polarized light corresponding to the transmission axis 52a, an electric field vector is polarized along the transmission axis 52a. The light shielding axis 52b is an axis that minimizes the transmittance of the corresponding polarized light. In this example, in the polarized light corresponding to the light shielding axis 52b, the electric field vector is along the light shielding axis 52b. The light shielding axis 52b of the polarizing element layer 52 configured as described above serves as an absorption axis along which the light is absorbed. In other words, when the polarized light corresponding to the light shielding axis 52b as the absorption axis is incident onto the polarizing element layer 52, an absorption rate becomes maximum.

The infrared light restriction layer 54 is located closer to the windshield 3 side than the polarizing element layer 52, for example. The infrared light restriction layer 54 is formed by laminating, for example, two or more types of dielectric films having different refractive indices on each other. In order to obtain spectral characteristics such that the reflectance of at least a part of the infrared light is increased more than the visible light, each film thickness of each dielectric film is appropriately set by causing, for example, a computer to calculate an interference with the light. With the use of a material which absorbs a part of the infrared light for the dielectric film, a part of the infrared light incident on the infrared light restriction layer 54 is absorbed. In this way, the infrared light restriction layer 54 transmits the light of an image that is a visible light, while restricting the transmission of the infrared light among an external light that is going to enter the apparatus 100 from the external of the apparatus 100. As an external light, there is, for example, sunlight that is going to enter the apparatus 100 through the windshield 3.

The placement of the polarizing plate 50 that transmits a part of the light of the image from the light guide portion 40 through the opening portion 12 toward the windshield 3 outside the housing 10 will be described in detail below. Specifically, in consideration of the luminance of the virtual image VI, the directions of the transmission axis 52a and the light shielding axis 52b in the polarizing plate 50 are set as follows.

When the occupant views the virtual image VI while wearing a polarizing sunglasses 6, the luminance of the virtual image VI changes due to the influence of the polarization direction of the light of the image which has been reflected on the windshield 3. Specifically, in the general polarizing sunglasses 6, the transmission axis Dst (hereinafter, referred to as a sunglass transmission axis) is set in the vertical direction and the absorption axis Dsa (hereinafter, referred to as a sunglass absorption axis) is set in the horizontal direction. For that reason, when the occupant seats on the seat of the vehicle 1 in a state where the occupant wears the polarizing sunglasses 6, the polarizing sunglasses 6 has a maximum transmittance for the light polarized in the vertical direction of the vehicle 1 and has a minimum transmittance for the light polarized in a direction perpendicular to the polarization direction of the vehicle 1. The transmission characteristic of the polarizing sunglasses 6 described above causes the luminance (hereinafter referred to as a sunglass luminance Ip) of the virtual image VI to visually vary according to the setting of the directions of the transmission axis 52a and the light shielding axis 52b.

On the other hand, when the occupant views the virtual image VI with the naked eye, since the light of the image which has been reflected on the windshield 3 is not affected by the polarization direction, it is apparently thought that a fixed luminance can be obtained without depending on the transmission axis 52a and the light shielding axis 52b of the polarizing plate 50. However, as shown in the Fresnel equation, the light reflectance of the image in the windshield 3 depends on the polarization direction of the light of the image incident on the windshield 3. For that reason, the luminance (hereinafter, referred to as naked-eye luminance I) of the virtual image VI to be visually recognized varies according to the setting of the directions of the transmission axis 52a and the light shielding axis 52b.

Now, first, as a comparative example, a case where the polarizing plate 50 is not provided is considered. In that case, the naked-eye luminance I is expressed by Expression 1, and the sunglass luminance Ip is expressed by Expression 2.

$$I = I_0 \cdot \{(R_p \cdot \sin(\theta-\alpha))^2 + (R_s \cdot \cos(\theta-\alpha))^2\} \quad \text{[Ex. 1]}$$

$$I_p = I_0 \cdot T \cdot (R_p \cdot \sin(\theta-\alpha) \cdot \cos\beta + R_s \cdot \cos(\theta-\alpha) \cdot \sin\beta)^2 \quad \text{[Ex. 2]}$$

In Expressions 1 and 2, IO is the luminance of the light of the image at the time of incidence to the windshield 3. $\alpha$ is an angle formed by the sunglass absorption axis Dsa and the polarization direction of the light of the image which has been reflected on the windshield 3. $\theta$ is an angle formed by the sunglass transmission axis Dst and a tangential direction Drt of the light of the image reflected on the windshield 3 to the reflection cross section. In the present specification, the reflection cross section is a plane including a light beam incident on and reflected on the windshield 3 and a normal line of the windshield 3 at an incident and reflection positions and is also generally called an incident surface. Rs is an s-polarized reflectance of the windshield 3. Rp is a p-polarized reflectance of the windshield 3. T is a transmittance for polarized light along the sunglass transmission axis Dst of the polarizing sunglasses 6.

Based on Expressions 1 and 2, a ratio Ip/I of the naked-eye luminance I to the sunglass luminance Ip is expressed by the following Expression 3.

$$I_p/I = T \cdot (R_p \cdot \sin(\theta-\alpha) \cdot \cos\theta + R_s \cdot \cos(\theta-\alpha) \cdot \sin\theta)^2 / \{(R_p \cdot \sin(\theta-\alpha))^2 + (R_s \cdot \cos(\theta-\alpha))^2\} \quad \text{[Ex. 3]}$$

In the comparative example described above, the variables for controlling the naked-eye luminance I, the sunglass luminance Ip, and the ratio Ip/I are $\alpha$ and $\theta$. However, in order to change $\alpha$ and $\theta$, there is a need to change a positional relationship of the accommodation space 1a, the windshield 3, and the driver's seat 4a, and taking the function and design of the vehicle 1, and the placement of other devices in the vehicle 1 into consideration, it is extremely difficult to change the positional relationship.

When the above-described Expressions 1 to 3 are applied to the present embodiment provided with the polarizing plate 50, the naked-eye luminance I is expressed by Expression 4, and the sunglass luminance Ip is expressed by Expression 5.

$$I = I_0 \cdot \cos(\beta-\alpha_0)\{(R_p \cdot \sin(\theta-\beta))^2 + (R_s \cdot \cos(\theta-\beta))^2\} \quad \text{[Ex. 4]}$$

$$I_p = I_0 \cdot T \cdot \cos(\beta-\alpha_0) \cdot (R_p \cdot \sin(\theta-\beta) \cdot \cos\theta + R_s \cdot \cos(\theta-\beta) \cdot \sin\theta)^2 \quad \text{[Ex. 5]}$$

$\alpha 0$ is an angle formed by the sunglass absorption axis Dsa and the polarization direction of the light of the image incident on the polarizing plate 50. $\beta$ is an angle formed by the sunglass absorption axis Dsa and the transmission axis 52a of the polarizing plate 50.

Based on Expressions 4 and 5, a ratio of the naked-eye luminance I to the sunglass luminance Ip is expressed by the following Expression 6.

$$I_p/I = T \cdot (R_p \cdot \sin(\theta-\beta) \cdot \cos\theta + R_s \cdot \cos(\theta-\beta) \cdot \sin\theta)^2 / \{(R_p \cdot \sin(\theta-\beta))^2 + (R_s \cdot \cos(\theta-\beta))^2\} \quad \text{[Ex. 6]}$$

According to Expressions 4 to 6, it can be understood that $\beta$ is appropriately set, thereby being capable of controlling the naked-eye luminance I, the sunglass luminance Ip, and the ratio Ip/I. In Expressions 1 to 6, since the sunglass transmission axis Dst coincides with the image longitudinal direction Dil and the sunglass absorption axis Dsa coincides with the image lateral direction Dis, those components can be replaced with each other. In the present embodiment, the s-polarized reflectance Rs is larger than the p-polarized reflectance Rp.

In this example, in the light of the image propagating from the projector 20 through the light guide portion 40, the polarizing plate 50, and the windshield 3 while being reflected or transmitted along the optical path from the projector 20, the respective azimuth angles are defined with the image lateral direction Dis as the reference orientation on the vibration plane PV perpendicular to the traveling direction Dc. Specifically, the azimuth angle of the polarization direction Dpp of the light of the image projected from the projector 20 is defined as the projection polarization azimuth angle $\alpha 0$. The azimuth angle of the transmission axis 52a of the polarizing plate 50 is defined as the transmission axis azimuth angle $\beta$.

In addition, the azimuth angle of the tangential direction Drt of the reflection cross section to the image longitudinal direction Dil as the reference orientation is defined as the reflection cross section azimuth angle $\theta$.

Figure 5:
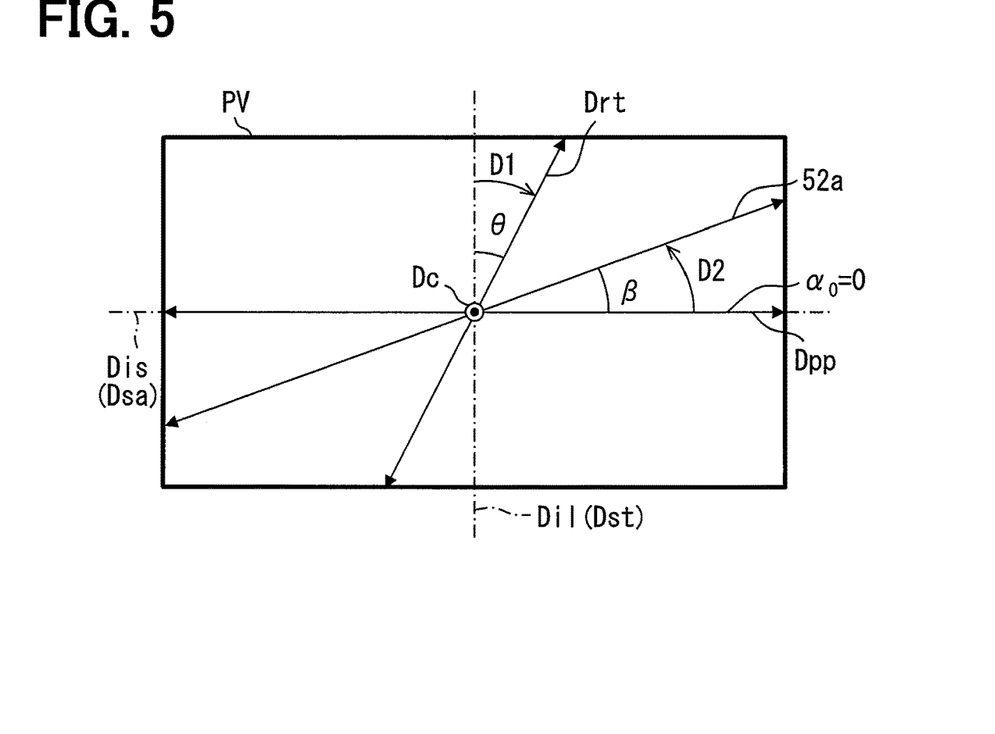
FIG. 5 is a schematic diagram illustrating a relationship of an azimuth angle and so on in the HUD apparatus according to the embodiment.

In FIG. 5, in the HUD apparatus 100 according to the present embodiment, in the viewpoint of an occupant viewing the windshield 3 from the eye point EP (that is, in the viewpoint of viewing the windshield 3 in a direction opposite to the traveling direction Dc of the image light), those azimuth angles $\alpha 0$, $\beta$, and $\theta$ are superimposed on each other in illustration. Depending on the placement of the reflecting elements 42 and 44 of the light guide portion 40, the polarization direction of the light of the image incident on the polarizing plate 50 may be deviated from the polarization direction Dpp of the projector 20 by, for example, about ±3 degrees (±10 degrees depending on the configuration of the light guide portion 40). However, for the purpose of knowing a tendency of the ratio Ip/I and so on of the luminance, the polarization direction Dpp and the polarization direction of the light of the image incident on the polarizing plate 50 may be regarded as the same. In addition, taking the above-mentioned replacement into consideration, the projection polarization azimuth angle $\alpha 0$ can be regarded as $\alpha 0$ in Expressions 4 to 5, the transmission axis azimuth angle $\beta$ can be regarded as $\beta$ in Expressions 4 to 6, the reflection cross section azimuth angle $\theta$ can be regarded as $\theta$ in Expressions 4 to 6, as the respective physical quantities.

Hereinafter, a description will be continued assuming that $\alpha 0$ is a projection polarization azimuth angle, $\beta$ is a transmission axis azimuth angle, and $\theta$ is a reflection cross section azimuth angle. Specifically, in the present embodiment, since the polarization direction Dpp of the light of the image projected from the projector 20 is along the image lateral direction Dis, the projection polarization azimuth angle $\alpha 0$ is 0°.

The relationship between the naked-eye luminance I as well as the sunglass luminance Ip, and the placement of the polarizing plate 50 will be described in more detail by the simulation of the present inventors who has acquired the knowledge of Expressions 4 to 6 described above with reference to the respective graphs of FIGS. 6 to 9. Each of the graphs of FIGS. 6 to 9 shows how the naked-eye luminance I and the sunglass luminance Ip change when the transmission axis azimuth angle $\beta$ is taken as a horizontal axis and the reflection cross section azimuth angle $\theta$ is taken as a vertical axis and those parameters $\beta$ and $\theta$ are changed.

A simulation A (refer to FIGS. 6 and 7) shows the naked-eye luminance I and the sunglass luminance Ip when an incident angle of the light of the image incident on the windshield 3 is 65 degrees. A simulation B (refer to FIGS. 8 and 9) shows naked-eye luminance I and sunglass luminance Ip when the incident angle of light of the image incident on the windshield 3 is 60 degrees. Compared with the simulation A, since an incident angle of the simulation B is characterized as being in the vicinity of the Brewster's angle, the p-polarized reflectance Rp relative to the s-polarized reflectance Rs is smaller.

Further, in FIGS. 6 to 9, RHD represents a right-hand drive vehicle, and LHD represents a left-hand drive vehicle. In other words, in the right-hand drive vehicle, the HUD apparatus 100 accommodated in the accommodation space 1a in the central portion of the instrument panel 2 causes the occupant seated on the driver's seat 4a, which is a seat on the right side of the vehicle, to visually recognize the virtual image VI through the windshield 3. In other words, the virtual image VI is formed at a position shifted toward the right side of the vehicle with respect to the accommodation space 1a.

In the left-hand drive vehicle, the HUD apparatus 100 accommodated in the accommodation space 1a in the central portion of the instrument panel 2 causes the occupant seated on the driver's seat 4a, which is a seat on the left side of the vehicle, to visually recognize the virtual image VI through the windshield 3. In other words, the virtual image VI is formed at a position shifted toward the left side of the vehicle with respect to the accommodation space 1a.

In FIGS. 6 to 9, the reflection cross section azimuth angle $\theta$ is set to be positive in the case of the right-hand drive vehicle, in other words, when the reflection cross-section is inclined to the right of the vehicle toward the upper side of the vehicle. In other words, the reflection cross section azimuth angle $\theta$ is set to be negative in the case of the left-hand drive vehicle, in other words, when the reflection cross-section is inclined to the left of the vehicle toward the upper side of the vehicle.

The transmission axis azimuth angle $\beta$ is set so that a clockwise direction from a reference orientation at the viewpoint of FIG. 5 is positive and a counterclockwise direction from the reference orientation is negative. In this case, attention should be paid to a fact that the direction is apparently reversed by reflection in the windshield 3 between the transmission axis 52a on the polarizing plate 50 in FIG. 3 and the transmission axis 52a in the viewing point in FIG. 5.

Figure 6:
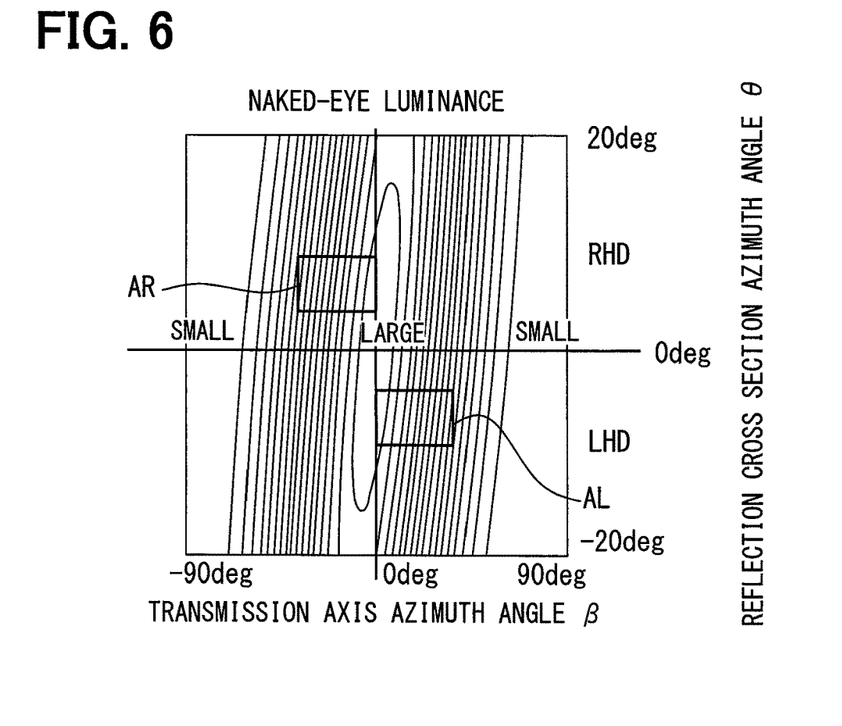
FIG. 6 is a graph showing simulation results of naked-eye luminance in the case of an incident angle of 65 degrees to a windshield.
Figure 7:
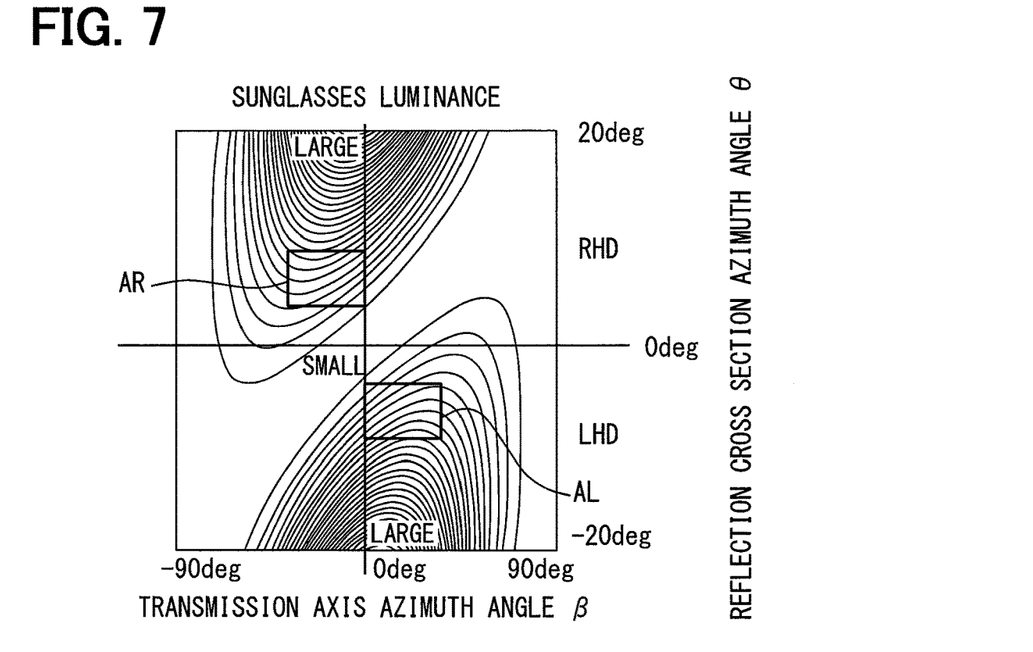
FIG. 7 is a graph showing simulation results of sunglass luminance in the case of the incident angle of 65 degrees to the windshield.

The simulation A will be described in detail. The naked-eye luminance I shown in FIG. 6 is the largest when the transmission axis azimuth angle $\beta$ is in the vicinity of 0 degrees and the luminance decreases more as the transmission axis azimuth angle $\beta$ increases more. The sunglasses luminance Ip shown in FIG. 7 tends to increase in a region in which the right-hand drive vehicle and the transmission axis azimuth angle $\beta$ are negative (that is, an upper left region in FIG. 7) and in a region in which the left-hand drive vehicle and the transmission axis azimuth angle $\beta$ is positive (that is, a lower right region of FIG. 7).

Therefore, in order to sufficiently obtain both of the naked-eye luminance I and the sunglass luminance Ip, it is optional that the transmission axis azimuth angle $\beta$ is set to be negative in the case of the right-hand drive vehicle, and it is optional that the transmission axis azimuth angle $\beta$ is set to be positive in the case of the left-hand drive vehicle. In particular, in the present embodiment, it is optional to set the transmission axis azimuth angle $\beta$ to an area AR in FIGS. 6 and 7 in the case of the right-hand drive vehicle and an area AL in FIGS. 6 and 7 in the case of the left-hand drive vehicle.

Figure 8:
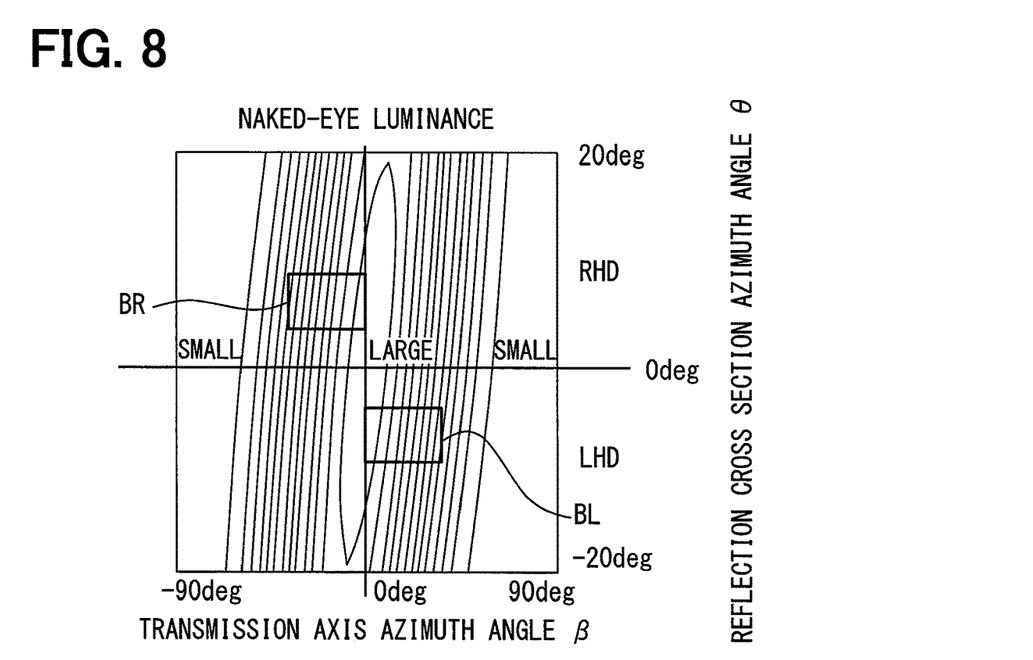
FIG. 8 is a graph showing simulation results of the naked-eye luminance in the case of an incident angle of 60 degrees to the windshield.
Figure 9:
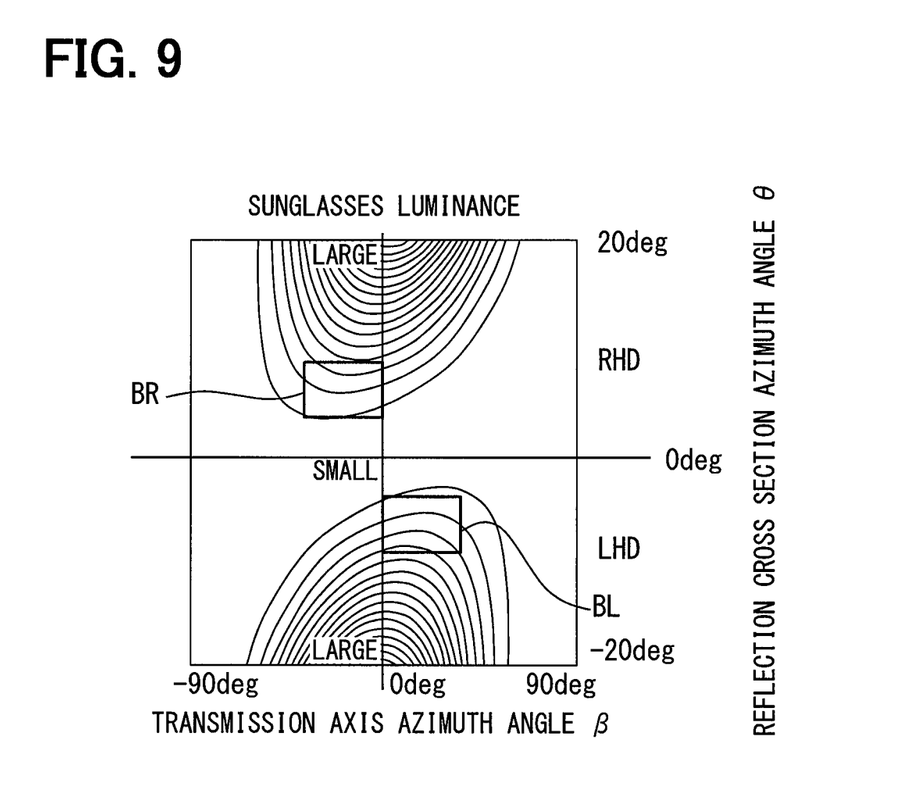
FIG. 9 is a graph showing simulation results of the sunglass luminance in the case of the incident angle of 60 degrees to the windshield.

The simulation B will be described in detail. The naked-eye luminance I shown in FIG. 8 is the largest when the transmission axis azimuth angle $\theta$ is in the vicinity of 0 degrees and the luminance decreases more as the transmission axis azimuth angle $\beta$ increases more. The sunglasses luminance Ip shown in FIG. 9 tends to increase in a region in which the right-hand drive vehicle and the transmission axis azimuth angle $\beta$ are negative (that is, an upper left region in FIG. 9) and in a region in which the left-hand drive vehicle and the transmission axis azimuth angle $\beta$ is positive (that is, a lower right region of FIG. 9).

Therefore, as with the simulation A, in order to sufficiently obtain both of the naked-eye luminance I and the sunglass luminance Ip, it is optional that the transmission axis azimuth angle $\beta$ is set to be negative in the case of the right-hand drive vehicle, and it is optional that the transmission axis azimuth angle is set to be positive in the case of the left-hand drive vehicle. In particular, in the present embodiment, it is optional to set the transmission axis azimuth angle $\beta$ to an area BR in FIGS. 8 and 9 in the case of the right-hand drive vehicle and an area BL in FIGS. 8 and 9 in the case of the left-hand drive vehicle.

Those simulations A and B show that there is the same tendency in the naked-eye luminance I and the sunglass luminance Ip under the condition that the incident angle is in the vicinity of the Brewster's angle and under the other conditions.

Based on the above, in the HUD apparatus 100 according to the present embodiment, the polarizing plate 50 are placed as follows. As shown in FIGS. 3 and 5, the polarizing plate 50 is located so that the projection polarization azimuth angle $\alpha 0$ and the transmission axis azimuth angle $\beta$ are different from each other. As a result, the polarization direction of the light of the image reflected on the windshield 3 is adjusted so as to tilt relative to both of the image longitudinal direction Dil and the image lateral direction Dis. The polarization direction has significance including a major axis direction of an elliptically polarized light.

Further, a first direction D1 and a second direction D2 described below are compared with each other with the light traveling direction Dc of the image as a rotation axis. The first direction D1 is a direction in which the tangential direction Drt of the reflection cross section of the light of the image reflected on the windshield 3 is less than 90 degrees relative to the image longitudinal direction Dil. The second direction D2 is a direction in which a direction indicated by the transmission axis azimuth angle $\beta$ is turned less than 90 degrees relative to the direction indicated by the projection polarization azimuth angle $\alpha 0$. The polarizing plate 50 is placed so that the first direction D1 and the second direction D2 are opposite to each other. For example, in the case of the right-hand drive vehicle shown in FIGS. 2 and 5, the first direction D1 is counterclockwise and the second direction D2 is clockwise. In the case of the left-hand drive vehicle, the first direction D1 is clockwise and the second direction D2 is counterclockwise.

Further, the polarizing plate 50 is placed so that an absolute value of a difference between the projection polarization azimuth angle $\alpha 0$ and the transmission axis azimuth angle $\beta$ is less than 45 degrees.

(Operational Effects)

The operational effects according to the present embodiment described above will be described below.

According to the present embodiment, the polarizing plate 50 is located on the optical path between the light guide portion 40 and the windshield 3 as the projection member. The transmission axis 52a of the polarizing plate 50 is located so that the transmission axis azimuth angle $\beta$ and the projection polarization azimuth angle $\alpha 0$ are different from each other. With the configuration described above, even in a case where a polarized state of the light of the image guided to the light guide portion 40 and directed to the windshield 3 after having been projected from the projector 20 is not an ideal state, for example, due to a mounting space, the transmission axis 52a can be adjusted by the polarizing plate 50. In this example, the adjustment is performed so that the polarization direction of the light of the image reflected on the windshield 3 tilts relative to both of the image longitudinal direction Dil and the image lateral direction Dis. Due to the above tilt, both of the component of the polarization in the vertical direction of the vehicle 1 corresponding to the image longitudinal direction Dil and the component of the polarization in the direction perpendicular to the vertical direction of the vehicle 1 corresponding to the image lateral direction Dis can be easily obtained. Therefore, the luminance can be balanced between a case in which the occupant visually recognizes the virtual image VI with the naked eye and a case in which the occupant visually recognizes the virtual image VI with the polarizing sunglasses 6 worn. As described above, the HUD apparatus 100 can be provided which achieves both of the visibility in the state of the naked eyes and the visibility in the state of wearing the polarizing sunglasses 6.

Further, according to the present embodiment, the first direction D1 in which the tangential direction Drt to the reflection cross section of the light of the image reflected on the windshield 3 rotates less than 90 degrees with respect to the image longitudinal direction Dil, and the second direction D2 in which the direction indicated by the transmission axis azimuth angle β rotates less than 90 degrees with respect to the direction indicated by the projection polarization azimuth angle α0 are opposite to each other. With the placement of the transmission axis 52a of the polarizing plate 50 as described above, as shown in Expressions 4 to 6 and the simulation results showing the naked-eye luminance and the sunglass luminance, the luminance can be balanced between the case where the occupant visually recognizes the virtual image VI with the naked eye and the case where the occupant visually recognizes the virtual image VI with the polarizing sunglasses 6 worn.

In addition, according to the present embodiment, the polarization direction Dpp of the light of the image projected from the projector 20 is along the image lateral direction Dis. The luminance can be balanced between the case where the occupant visually recognizes the virtual image VI with the naked eye and the case where the occupant visually recognizes the virtual image VI with the polarizing sunglasses 6 worn, while the amount of s-polarized light in the reflection cross section of the windshield 3 is maintained because of the polarization direction Dpp of the projector 20 described above while the placement of the transmission axis 52a of the polarizing plate 50 is slightly adjusted with respect to the polarization direction Dpp.

Further, according to the present embodiment, the absolute value of the difference between the projection polarization azimuth angle α0 and the transmission axis azimuth angle β is less than 45 degrees. With the above configuration, a loss caused when the light of the image passes through the polarizing plate 50 can be reduced to less than half the loss.

Further, according to the present embodiment, the polarizing plate 50 closes the entire surface of the opening portion 12. With the polarizing plate 50 described above, the light of the image is allowed to pass through the windshield 3 from the light guide portion 40 while an internal structure of the HUD apparatus 100 is restricted from being seen from the outside. As a result, both of the visibility in the naked eye state and the visibility in a state where the polarizing sunglasses 6 are worn can be performed.

Further, according to the present embodiment, the polarizing plate 50 has the infrared light restriction layer 54 that absorbs an infrared light. With the above configuration, the infrared light from the outside of the apparatus 100 can be restricted from reaching the projector 20 to generate a heat on the projector 20. Therefore, with an increase in the life of the projector 20, both of the visibility in the naked eye state and the visibility in the state where the polarizing sunglasses 6 are worn can be performed for a long time.

OTHER EMBODIMENTS

Hitherto, an embodiment of the present disclosure has been described. However, this disclosure is not construed as limited to the embodiment, and can be applied to various embodiments within the scope not departing from the gist of this disclosure.

Specifically, as a modification 1, the incident angle of the light of the image incident on the windshield 3 may be set to other than 60 degrees and 65 degrees. For example, the incident angle may be set in a range of 20 to 80 degrees.

As a modification 2, the polarization direction Dpp of the light of the image projected from the projector 20 may not be along the image lateral direction Dis. For example, the projection polarization azimuth angle α0 may be set in a range of −45 to +45 degrees, and a projector 20 of +45 degrees or −45 degrees using a general liquid crystal panel may be employed.

As a modification 3, the polarizing plate 50 does not need to cover the entire surface of the opening portion 12.

As a modification 4, the polarizing plate 50 may not have the infrared light restriction layer 54.

As a modification 5, as long as the projector 20 projects the polarized image light, a method of projecting the light of the image with, for example, a linearly polarized laser may be employed in addition to a method using the liquid crystal panel 30.

As a modification 6, the light guide portion 40 may be configured by only the concave mirror 44, or may be added with another optical element.

As a modification 7, the present disclosure can be applied to some of the images.

As described above, the head-up display apparatus is mounted on the vehicle 1 to project the image on the projection member 3 by causing the light of the image to be reflected on the projection member to display the virtual image of the image visible by the occupant. The head-up display apparatus 1 includes the projector 20, the light guide portion 40, and the polarizing plate 50. The projector 20 projects the polarized light of the image. The light guide portion 40 guides the light of the image from the projector toward the projection member. The polarizing plate 50 is located on the optical path between the light guide portion and the projection member and has the transmission axis 52a along which the transmittance of the corresponding polarized light becomes maximum. The direction along the vertical direction of the vehicle is defined as the image longitudinal direction Dil, and the direction perpendicular to the image longitudinal direction in the image is defined as the image lateral direction Dis when the image is displayed as the virtual image. The azimuth angle of the polarization direction Dpp of the light of the image projected from the projector 20 is defined as the projection polarization azimuth angle α0, and the azimuth angle of the transmission axis of the polarizing plate is defined as the transmission axis azimuth angle β, the azimuth angles are relative to the image lateral direction being the reference orientation. The polarizing plate 50 makes the projection polarization azimuth angle α0 different from the transmission axis azimuth angle to adjust the polarization direction of the light of the image reflected on the projection member to be tilted relative to both of the image longitudinal direction Dil and the image lateral direction Dis.

According to the configuration described above, the polarizing plate is located on the optical path between the light guide portion and the projection member. The transmission axis of the polarizing plate is located so that the transmission axis azimuth angle and the projection direction azimuth angle are different from each other. With the configuration described above, even in a case where a polarized state of the light of the image guided to the light guide portion and directed to the projection member after having been projected from the projector is not an ideal state, for example, due to a mounting space, the transmission axis can be adjusted by the polarizing plate. In this example, the adjustment is performed so that the polarization direction of the light of the image reflected on the projection member tilts relative to both of the image longitudinal direction and the image lateral direction. Due to the above tilt, both of the component of the polarization in the vertical direction of the vehicle corresponding to the image longitudinal direction and the component of the polarization in the direction perpendicular to the vertical direction of the vehicle corresponding to the image lateral direction can be easily obtained. Therefore, the luminance can be balanced between a case in which the occupant visually recognizes the virtual image with the naked eye and a case in which the occupant visually recognizes the virtual image with the polarizing sunglasses worn. As described above, the HUD apparatus can be provided which achieves both of the visibility in the state of the naked eyes and the visibility in the state of wearing the polarizing sunglasses.

The present disclosure is described based on the embodiments, and it is understood that this disclosure is not limited to the embodiments or the structure. The present disclosure includes various modification examples and modifications within the same range. In addition, it should be understood that various combinations or aspects, or other combinations or aspects, in which only one element, one or more elements, or one or less elements is included to the various combinations or aspects, are included in the scope or the technical idea of the present disclosure.

What is claimed is:

1. A head-up display apparatus to be mounted on a vehicle to project an image on a projection member by causing a light of the image to be reflected on the projection member to display a virtual image of the image visible by an occupant, the head-up display apparatus comprising:
    a projector to project a polarized light of the image;
    a light guide portion to guide the light of the image from the projector toward the projection member; and
    a polarizing plate located on an optical path between the light guide portion and the projection member and has a transmission axis along which a transmittance of the polarized light becomes maximum, wherein
    an image longitudinal direction is defined as a direction along a vertical direction of the vehicle, and an image lateral direction is defined as a direction perpendicular to the image longitudinal direction in the image, in a condition where the image is displayed as the virtual image,
    a projection polarization azimuth angle is defined as an azimuth angle of a polarization direction of the light of the image projected from the projector, and a transmission axis azimuth angle is defined as an azimuth angle of the transmission axis of the polarizing plate, the azimuth angles being relative to the image lateral direction as a reference orientation,
    the polarizing plate makes the projection polarization azimuth angle different from the transmission axis azimuth angle to tilt the polarization direction of the light of the image reflected on the projection member relative to both of the image longitudinal direction and the image lateral direction,
    a tangential direction of a reflection cross section of the light of the image reflected on the projection member is rotated about a rotation axis, which is in a traveling direction of the light of the image, by 90 degrees or less in a first direction with respect to the image longitudinal direction,
    a direction represented by the transmission axis azimuth angle is rotated about the rotation axis by 90 degrees or less in a second direction with respect to a direction represented by the projection polarization azimuth angle, and
    the first direction and the second direction are opposite to each other.

2. The head-up display apparatus according to claim 1, wherein
    the polarization direction of the light of the image projected from the projector is along the image lateral direction.

3. The head-up display apparatus according to claim 1, wherein
    an absolute value of a difference between the projection polarization azimuth angle and the transmission axis azimuth angle is less than 45 degrees.

4. The head-up display apparatus according to claim 1, further comprising:
    a housing having an opening portion through which the light of the image passes from the light guide portion to the projection member, wherein
    the polarizing plate closes an entirety of the opening.

5. The head-up display apparatus according to claim 1, wherein
    the polarizing plate has an infrared light restriction layer that restricts transmission of infrared light.

* * * * *